US012079619B2

(12) United States Patent
Shin

(10) Patent No.: US 12,079,619 B2
(45) Date of Patent: Sep. 3, 2024

(54) FIRMWARE-OVER-THE-AIR (FOTA) UPDATE FOR WIRELESS DEVICES IN AN INTERNET OF THINGS (IOT) NETWORK

(71) Applicant: T-Mobile USA, Inc., Bellevue, WA (US)

(72) Inventor: Hogan Shin, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 55 days.

(21) Appl. No.: 17/875,218

(22) Filed: Jul. 27, 2022

(65) Prior Publication Data

US 2024/0036847 A1    Feb. 1, 2024

(51) Int. Cl.
| | |
|---|---|
| *G06F 8/65* | (2018.01) |
| *H04L 67/00* | (2022.01) |
| *H04L 67/12* | (2022.01) |
| *H04W 8/24* | (2009.01) |

(52) U.S. Cl.
CPC ............... *G06F 8/65* (2013.01); *H04L 67/12* (2013.01); *H04L 67/34* (2013.01); *H04W 8/245* (2013.01)

(58) Field of Classification Search
CPC ..... G06F 8/60–66; H04L 67/12; H04W 8/245
USPC ................................................. 717/168–178
See application file for complete search history.

(56) References Cited

U.S. PATENT DOCUMENTS 6,640,334 B1    10/2003  Rasmussen
6,832,373 B2    12/2004  Oneill
7,146,412 B2    12/2006  Turnbull
7,657,884 B2     2/2010  Okonnen et al.
(Continued)

FOREIGN PATENT DOCUMENTS

| CN | 101610501 A | 12/2009 |
|---|---|---|
| CN | 101674590 A | 3/2010 |

(Continued)

OTHER PUBLICATIONS

Wang, Zhenjiang, et al., An Efficient and Dependable FOTA-Based Upgrade Mechanism for In-Vehicle Systems, International Conference on iThings and GreenCom and CPSCom and SmartData, 2019, 6 pages, [retrieved on Nov. 15, 2023], Retrieved from the Internet: <URL:http://ieeexplore.ieee.org/>.*

(Continued)

*Primary Examiner* — Geoffrey R St Leger
(74) *Attorney, Agent, or Firm* — Perkins Coie LLP

(57) ABSTRACT

A server system for updating firmware of a client device in an IoT network receives an indication that the client device has re-registered after being de-registered. The server system determines a current version of firmware and a latest successful status of a FOTA update on the client device. When the current version of the firmware corresponds to a latest version of the firmware available, the server system saves information regarding the latest version of the firmware to its database. When the current version of the client device does not correspond to the latest version of the firmware available, the server system transmits an upgrade package of the FOTA update and an indication of the latest successful status of the FOTA update to the client device. The server system thereby enables the client device to continue the FOTA update from the latest successful status of the FOTA update.

20 Claims, 6 Drawing Sheets

(56) References Cited

U.S. PATENT DOCUMENTS

| | | |
|---|---|---|
| 7,698,698 B2 | 4/2010 | Skan |
| 7,747,997 B1 | 6/2010 | Rao |
| 7,770,165 B2 | 8/2010 | Olson et al. |
| 7,805,719 B2 | 9/2010 | Oneill |
| 7,881,745 B1 | 2/2011 | Rao et al. |
| 7,987,449 B1 | 7/2011 | Marolia et al. |
| 8,122,447 B2 | 2/2012 | Cohen et al. |
| 8,161,277 B2 | 4/2012 | Shih et al. |
| 8,402,109 B2 | 3/2013 | Marino et al. |
| 8,555,273 B1 | 10/2013 | Chia et al. |
| 8,589,910 B2 | 11/2013 | Zubas et al. |
| 8,677,343 B2 | 3/2014 | Averbuch et al. |
| 8,726,259 B2 | 5/2014 | Juneja |
| 8,869,134 B2 | 10/2014 | Segalov |
| 8,892,699 B2 | 11/2014 | Mann |
| 8,893,110 B2 | 11/2014 | Kapadekar et al. |
| 9,128,796 B2 | 9/2015 | Chitre et al. |
| 9,134,994 B2 | 9/2015 | Patel et al. |
| 9,307,067 B2 | 4/2016 | Debates et al. |
| 9,332,424 B2 | 5/2016 | Logan et al. |
| 9,383,990 B2 | 7/2016 | Lu et al. |
| 9,430,225 B2 | 8/2016 | Ko |
| 9,558,353 B2 | 1/2017 | Marino et al. |
| 9,639,342 B2 | 5/2017 | Kryzer |
| 9,645,812 B2 | 5/2017 | Proschowsky |
| 9,684,508 B2 | 6/2017 | Oku et al. |
| 9,715,379 B2 | 7/2017 | He et al. |
| 9,804,832 B2 | 10/2017 | Yu |
| 9,847,018 B2 | 12/2017 | E Silva et al. |
| 9,864,599 B2 | 1/2018 | Lu et al. |
| 9,875,093 B2 | 1/2018 | Li |
| 10,083,021 B2 | 9/2018 | Jamadagni et al. |
| 10,140,114 B2 | 11/2018 | Nogueira-nine |
| 10,140,117 B2 | 11/2018 | Annapureddy et al. |
| 10,162,622 B2 | 12/2018 | Gandhi et al. |
| 10,182,304 B2 | 1/2019 | Vyas et al. |
| 10,185,553 B2 | 1/2019 | Annapureddy et al. |
| 10,235,159 B2 | 3/2019 | Lodeiro et al. |
| 10,430,130 B2 | 10/2019 | Nakamura |
| 10,437,581 B1 | 10/2019 | Patil |
| 10,564,957 B2 | 2/2020 | Okamoto et al. |
| 10,684,842 B2 | 6/2020 | Lin et al. |
| 10,866,800 B2 | 12/2020 | Sugiyama et al. |
| 10,871,952 B2 | 12/2020 | Wang et al. |
| 10,945,262 B2 | 3/2021 | Li et al. |
| 10,986,489 B1 | 4/2021 | Parra-yepez |
| 11,070,427 B2 | 7/2021 | Lee et al. |
| 11,082,294 B2 | 8/2021 | Magley et al. |
| 11,093,233 B2 | 8/2021 | Tomasini et al. |
| 11,106,450 B2 | 8/2021 | Hu |
| 2003/0217357 A1 | 11/2003 | Parry |
| 2005/0055595 A1 | 3/2005 | Frazer et al. |
| 2005/0144612 A1 | 6/2005 | Wang et al. |
| 2005/0186952 A1 | 8/2005 | Kitajima |
| 2006/0200658 A1 | 9/2006 | Penkethman |
| 2007/0169073 A1 | 7/2007 | Oneill et al. |
| 2008/0065816 A1 | 3/2008 | Seo |
| 2008/0168435 A1 | 7/2008 | Tupman et al. |
| 2009/0075641 A1 | 3/2009 | Guven et al. |
| 2009/0077634 A1 | 3/2009 | Hung |
| 2010/0175062 A1 | 7/2010 | Kim |
| 2011/0265075 A1 | 10/2011 | Lee |
| 2012/0102477 A1 | 4/2012 | Kim et al. |
| 2012/0198434 A1 | 8/2012 | Dirstine et al. |
| 2013/0152069 A1 | 6/2013 | Li |
| 2013/0275956 A1 | 10/2013 | Lai et al. |
| 2017/0102934 A1 | 4/2017 | Xu |
| 2017/0139698 A1* | 5/2017 | Muroyama ............. G06F 8/656 |
| 2017/0242679 A1 | 8/2017 | Sangameswaran et al. |
| 2017/0286091 A1* | 10/2017 | Jepson .................. G06F 9/4408 |
| 2017/0322796 A1 | 11/2017 | Kim et al. |
| 2018/0046452 A1 | 2/2018 | Preus et al. |
| 2018/0210726 A1 | 7/2018 | Jun et al. |
| 2019/0187972 A1 | 6/2019 | Hirose |
| 2019/0303130 A1 | 10/2019 | M. Saeed et al. |
| 2020/0012488 A1 | 1/2020 | Koval et al. |
| 2020/0301693 A1 | 9/2020 | Patel et al. |
| 2020/0409687 A1 | 12/2020 | Rouland et al. |
| 2021/0004222 A1 | 1/2021 | Huang et al. |
| 2021/0119858 A1 | 4/2021 | De Smet et al. |

FOREIGN PATENT DOCUMENTS

| | | |
|---|---|---|
| CN | 101778376 A | 7/2010 |
| CN | 102033758 A | 4/2011 |
| CN | 104423981 A | 3/2015 |
| CN | 106210102 A | 12/2016 |
| CN | 106325818 A | 1/2017 |
| CN | 107168752 A | 9/2017 |
| CN | 103970566 B | 10/2017 |
| CN | 107707405 A | 2/2018 |
| CN | 107832064 A | 3/2018 |
| CN | 107957877 A | 4/2018 |
| CN | 104461666 B | 5/2018 |
| CN | 108616391 A | 10/2018 |
| CN | 109101257 A | 12/2018 |
| CN | 109976784 A | 7/2019 |
| CN | 107291516 B | 10/2019 |
| CN | 111338670 A | 6/2020 |
| CN | 111464321 A | 7/2020 |
| CN | 111541564 A | 8/2020 |
| CN | 111565122 A | 8/2020 |
| CN | 111796853 A | 10/2020 |
| CN | 111817874 A | 10/2020 |
| CN | 112148326 A | 12/2020 |
| CN | 112181466 A | 1/2021 |
| CN | 112291323 A | 1/2021 |
| CN | 106557339 B | 2/2021 |
| CN | 112306514 A | 2/2021 |
| CN | 112363742 A | 2/2021 |
| CN | 111212121 B | 5/2021 |
| DE | 10231940 A1 | 2/2003 |
| DE | 102016201361 A1 | 8/2016 |
| DE | 102016116168 A1 | 3/2018 |
| DE | 102017213405 A1 | 2/2019 |
| EP | 3001310 B1 | 10/2019 |
| JP | 2004139224 A | 5/2004 |
| JP | 2012221197 A | 11/2012 |
| JP | 6536533 B2 | 6/2019 |
| JP | 6536534 B2 | 6/2019 |
| JP | 2019109876 A | 7/2019 |
| JP | 6569524 B2 | 8/2019 |
| JP | 2021093023 A | 6/2021 |
| KR | 20060053273 A | 5/2006 |
| KR | 100759604 B1 | 9/2007 |
| KR | 20100033243 A | 3/2010 |
| KR | 100951851 B1 | 4/2010 |
| KR | 100968673 B1 | 7/2010 |
| KR | 101200025 B1 | 11/2012 |
| KR | 101424246 B1 | 8/2014 |
| KR | 101525811 B1 | 6/2015 |
| KR | 101566979 B1 | 11/2015 |
| KR | 20150146327 A | 12/2015 |
| KR | 20180052479 A | 5/2018 |
| KR | 102068121 B1 | 1/2020 |
| KR | 102132901 B1 | 7/2020 |
| KR | 102145608 B1 | 8/2020 |
| WO | 2009079866 A1 | 7/2009 |
| WO | 2011137793 A1 | 11/2011 |
| WO | 2016092006 A1 | 6/2016 |
| WO | 2017168408 A1 | 10/2017 |
| WO | 2018063260 A1 | 4/2018 |
| WO | 2020239499 A1 | 12/2020 |
| WO | 2021104633 A1 | 6/2021 |

OTHER PUBLICATIONS

Doddapaneni, Krishna, et al., Secure FoTA object for IoT, IEEE 42nd Conference on Local Computer Networks Workshops, 2017,

(56) References Cited

OTHER PUBLICATIONS 6 pages, [retrieved on Nov. 15, 2023], Retrieved from the Internet: <URL:http://ieeexplore.ieee.org/>.*

* cited by examiner

FIRMWARE-OVER-THE-AIR (FOTA) UPDATE FOR WIRELESS DEVICES IN AN INTERNET OF THINGS (IOT) NETWORK

BACKGROUND

Firmware-over-the-air (FOTA) is a mobile software management technology that enables operating firmware of wireless devices over a network (i.e., "over the air"). The operations include upgrading and updating the firmware of the wireless devices in the network. In particular, the FOTA allows device manufacturers to provide firmware updates to a large batch of wireless devices in an automated, timely, and efficient manner. The updates can include repairing bugs, and/or installing new software updates, features, or services. An update executed via FOTA technology causes minimal disturbance to users of the wireless devices.

FOTA updates can be managed and enabled using a light-weight machine-to-machine (LWM2M) protocol between a client and a server. LWM2M protocol is designed to reduce power and data usage for low-power devices having limited processing power and bandwidth. The LWM2M protocol is especially useful for the management of devices that are far away from a power source and need to use a battery-powered local device or have no power cord. The LWM2M protocol is used across several industries, such as telecommunications, automotive, security device, manufacturing, and so on. Furthermore, the LWM2M protocol can be applied to update and upgrade wireless devices in Internet of things (IoT) networks. IoT refers to devices that include processing ability, software, sensors, receivers, and/or other relevant technologies enabling communications with other devices and systems within a network. The devices can connect and exchange data with other devices and systems over the Internet or other communication networks.

BRIEF DESCRIPTION OF THE DRAWINGS

Detailed descriptions of implementations of the present invention will be described and explained through the use of the accompanying drawings.

Figure 1:
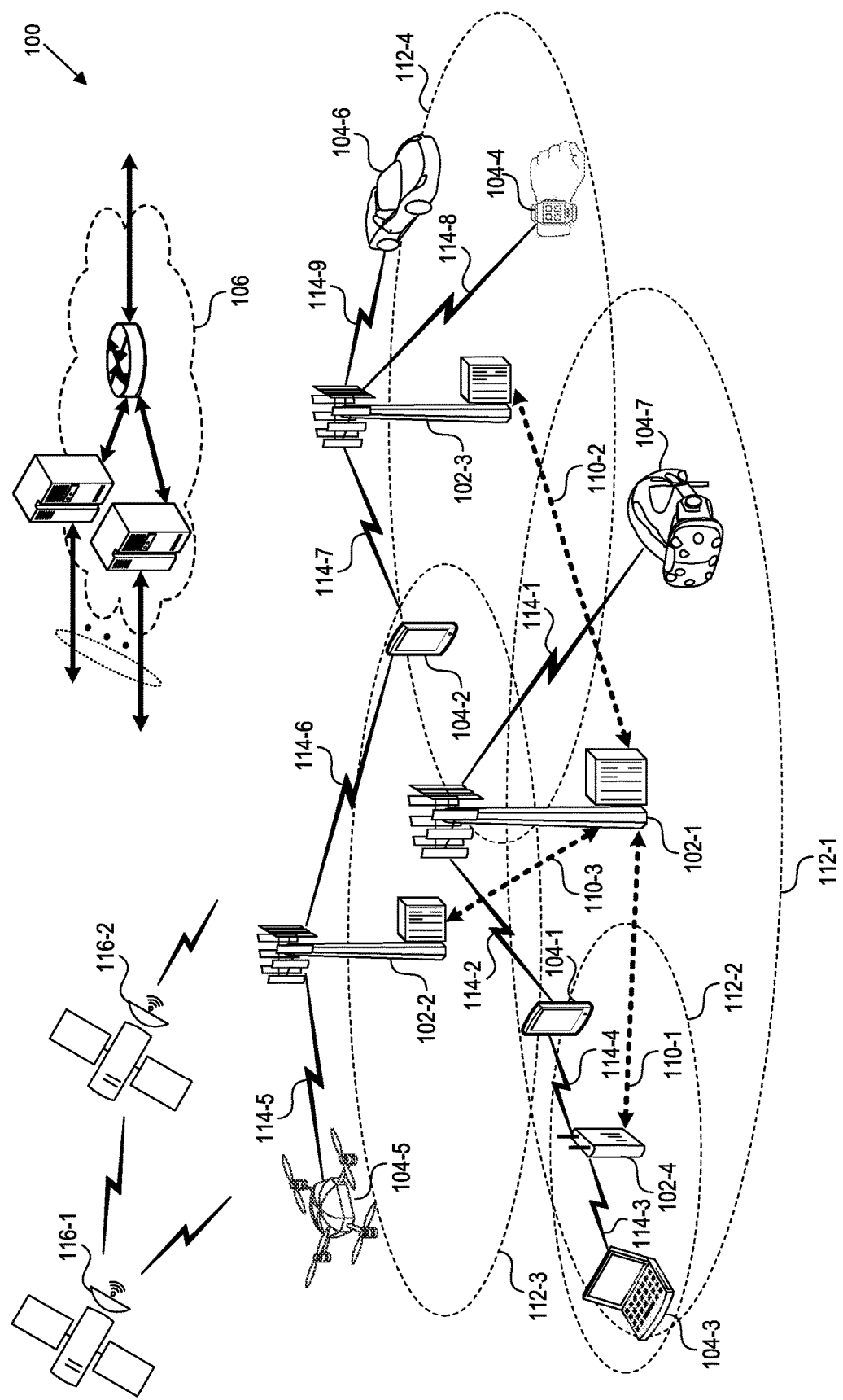
FIG. 1 is a block diagram that illustrates a wireless communications system that can implement aspects of the present technology in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to updating the firmware of wireless devices in an internet of things (IoT) network by firmware over-the-air (FOTA) update when the wireless device is in communication with a server system via LWM2M protocol. In particular, the disclosed technology provides for tracking of a FOTA update status on a respective wireless device of the IoT network when the wireless device has de-registered from the IoT network while downloading or executing an update package. The tracking is performed by read and observe requests sent by a server system in communication with the wireless device. The read and observe requests are used for determining a current version of firmware of the wireless device and a latest successful status of the FOTA update on the wireless device. The tracking enables the wireless device to continue the FOTA update from a latest successful status of the FOTA update in an instance where the FOTA update was not completed due to an interruption (e.g., de-registration). The disclosed technology further includes saving information regarding a latest version of the firmware of the wireless device to a database of the server system after the FOTA update is successfully completed.

In one example, a server system is configured to receive an indication that a wireless device in an IoT network has re-registered after being de-registered for a period of time. For example, the wireless device is connected to the IoT network after being disconnected. The server system is configured to determine a current version of firmware on the wireless device as well as a latest successful status of a FOTA update. In accordance with a determination that the current version of the firmware corresponds to a latest version of the firmware available, the server system determines that the FOTA update was completed successfully on the wireless device. The server system then saves information regarding the latest version of the firmware on the wireless device to its database. In accordance with a determination that the current version of the client device does not correspond to the latest version of the firmware available, the server system transmits an upgrade package of the FOTA update to the wireless device. The server system also transmits an indication of the latest successful status of the FOTA update to the wireless device. The server system thereby enables the wireless device to continue the FOTA update from the latest successful status of the FOTA update. Subsequently, the server system determines the current version of the firmware of the wireless device again (e.g., by sending an observe request to the wireless device). In accordance with the determination that the current version of the firmware corresponds to the latest version of the firmware available, the server system determines that the FOTA update was completed successfully on the wireless device and saves the information regarding the latest version of the firmware on the wireless device to its database.

In another example, the server system receives an indication that the client device has re-registered to the IoT network and that the FOTA update on the client device has failed. The server system determines the current version of the firmware as well as the latest successful status of the FOTA update on the client device. In accordance with a determination that the current version of the firmware of the client device does not correspond to the latest version of the firmware available, the server system transmits an upgrade package of the FOTA update to the wireless device. The server system also transmits an indication of the latest successful status of the FOTA update to the wireless device. The server system thereby enables the wireless device to continue the FOTA update from the latest successful status of the FOTA update. The server system receives from the client device an indication that the FOTA update on the client device was completed successfully. In response to the indication, the server system saves information regarding the current version of the firmware of the client device to its database.

In yet another example, a wireless device in communication with an IoT network is configured to download a FOTA update package from a server system. The wireless device executed a FOTA update by executing the downloaded FOTA update package. During download or execution of the FOTA package, the wireless device disconnects from the IoT network in response to a first triggering event. The wireless device reconnects to the IoT again in response to a second triggering event. For example, the wireless device is turned on after being turned off for a period of time. The wireless device receives from the server system an indication to download an upgrade to the FOTA update package and to continue executing the FOTA update from the latest successful FOTA status. The wireless device also receives an observation request related to the status of the FOTA update. The observation request includes instructions to send an indication to the server system when the wireless device has completed the FOTA update. The wireless device continues to execute the FOTA update from the latest successful FOTA status and, upon successfully completing the FOTA update, sends the indication that the FOTA update is completed to the server system.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Workflow Sequence

Figure 2A:
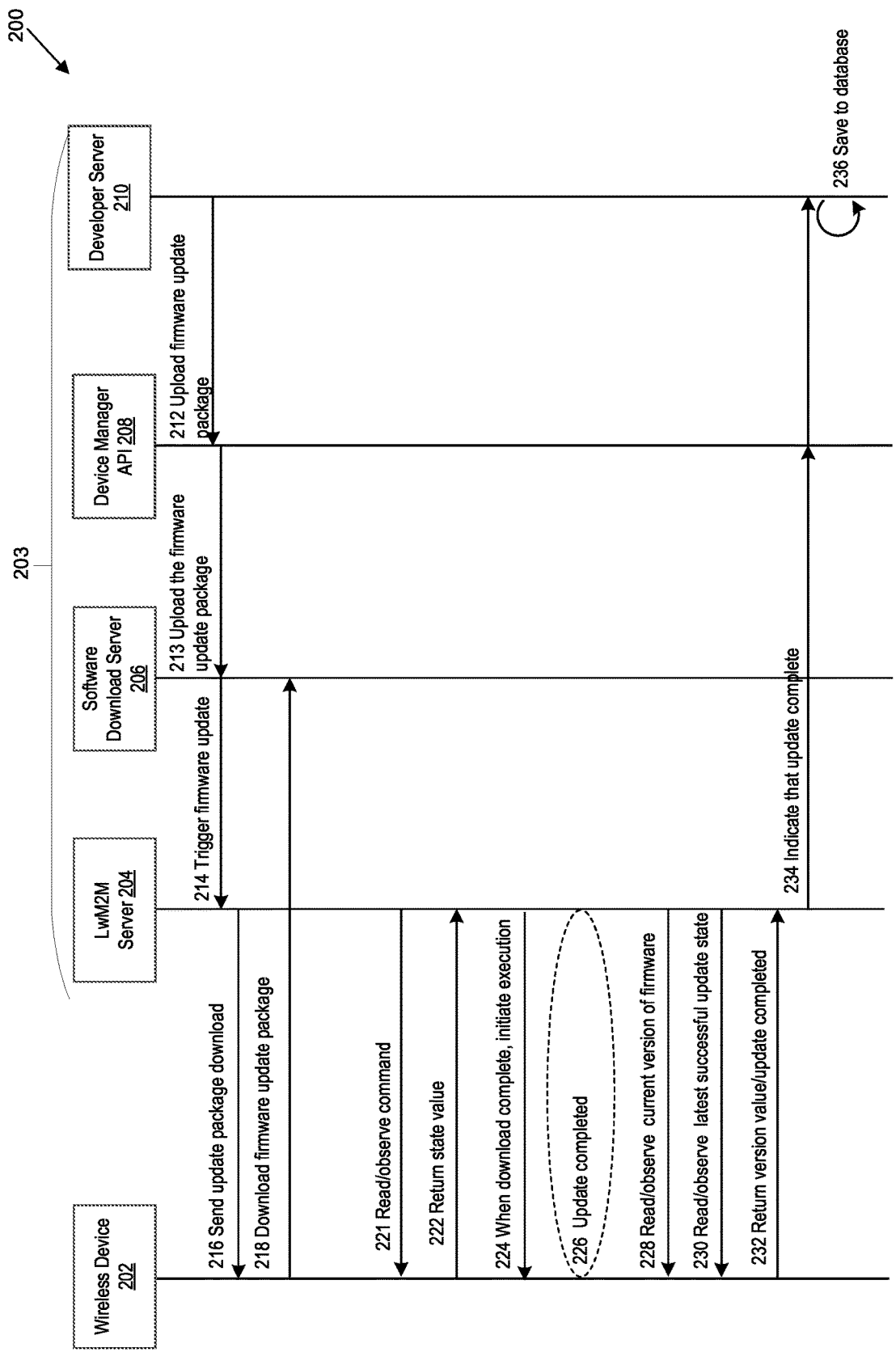
FIGS. 2A and 2B are sequence charts illustrating a workflow for updating firmware of a wireless device in an IoT network in some implementations.
Figure 2B:
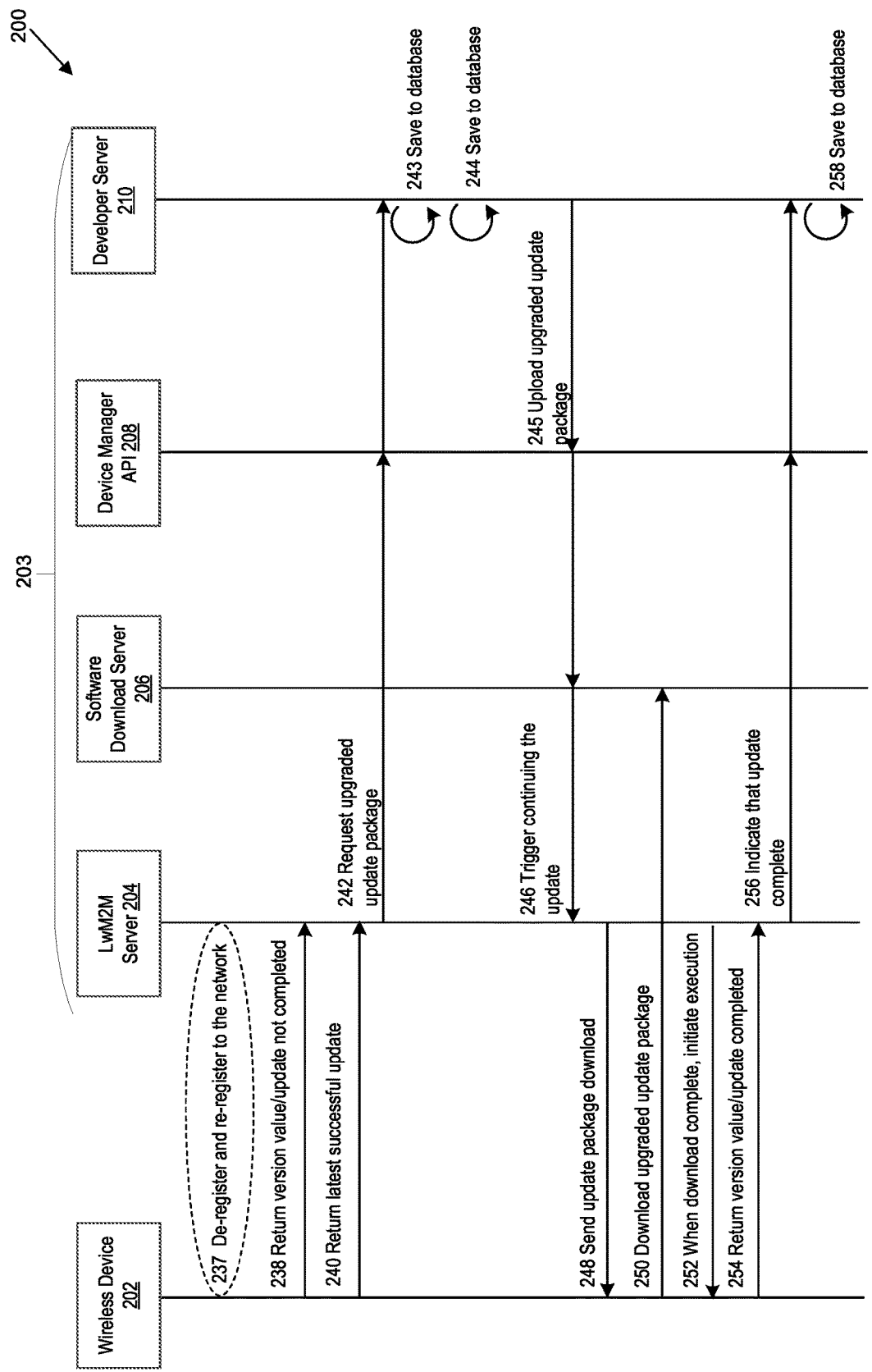

FIGS. 2A and 2B are sequence diagrams illustrating a workflow 200 for updating firmware of a wireless device 202 in a network of wireless device (e.g., an IoT network). The wireless device 202 is in communication with a server system 203 configured to update the firmware of the wireless device 202 via FOTA technology.

The wireless device 202 (also referred to as a client device) can correspond to a device including processing ability, software, sensors, receivers, and/or other relevant technologies enabling wireless communications with other devices and systems within the IoT via various connectivity standards. In some implementations, the wireless device 202 corresponds to any of the wireless devices 104-1 through 104-7 described above with respect to FIG. 1. In some implementations, the wireless device corresponds to smart home appliances (e.g., lighting fixtures, thermostats, home security systems, cameras, speakers, and other smart home appliances), smart healthcare devices, smart transportation devices (e.g., traffic control devices, toll collection devices, vehicle control devices), vehicular communications devices, industrial equipment, manufacturing equipment, and/or agricultural equipment. The network of wireless devices can include a large number of devices (e.g., more than one thousand devices). In some implementations, the server system 203 is configured to update the firmware of the devices in the IoT concurrently or nearly concurrently via the FOTA technology.

The network of wireless devices can be a narrowband (NB) IoT network. NB IoT network refers to a low-power wide-area network (LPWAN) radio technology for wireless devices (e.g., cellular devices) and services. For example, the NB IoT uses a subset of the LTE standard that is limited to a single narrow bandwidth of 200 kHz. NB IoT can be useful for low cost, long battery life, and high connection density networks.

The server system 203 includes multiple servers or computer systems. In FIGS. 2A and 2B, the server system 203 includes an LwM2M server 204, a software download server 206, a device manager server 208, and a developer server 210. In some implementations, the LWM2M server 204 is configured to operate the LWM2M application protocol between the server system 203 and multiple wireless devices of the network of wireless devices. The LWM2M server 204 can be a bootstrap server configured to provide application-independent functions between the wireless devices and the server system 203 that are unknown to each other.

The software download server 206 is configured to provide software packages (e.g., update packages) for the wireless devices of the network of wireless devices for download. The software download server 206 can receive the software packages from the developer server 210 via the device manager server 208. In some implementations, the developer server 210 is configured to generate and provide software packages, such as firmware update packages (e.g., FOTA update packages) for updating the wireless devices in the network of wireless devices. The developer server 210 can generate and provide the firmware update packages periodically or as needed. The developer server 210 can be part of the server system 203 or a separate server in communication with the server system 203. For example, the developer server 210 is a server of a third-party software developer in communication with the server system 203. In some implementations, the device manager server 208 is configured to operate an application programming interface (API) protocol between different servers. An API includes a set of definitions and protocols that enable interaction between different computer systems or different computer programs. For example, the device manager server 208 enables interaction between developer server 210 configured to generate software packages and the software download server 206 configured to facilitate downloading the software packages by the wireless devices of the network of wireless devices.

The workflow 200 for updating the firmware is applicable to batch updates of wireless devices in the network of wireless devices. The different interactions between the server system 203 and the wireless devices are concurrently performed between the server system 203 and a group of wireless devices that are designated to receive the same firmware update. For example, in FIGS. 2A and 2B the workflow 200 is described between the server system 203 and a single wireless device (e.g., the wireless device 202), but it is understood that the workflow 200 can be performed concurrently with the group of wireless devices. For example, the group of wireless devices includes handheld mobile devices 104-1 or 104-2, laptops 104-3, wearables 104-4, drones 104-5, vehicles with wireless connectivity 104-6, or head-mounted displays with wireless augmented reality/virtual reality (AR/VR) connectivity 104-7, or any other type of wireless device applicable to communication with network of wireless devices. In some implementations, the group of wireless devices has the same firmware.

At act 212, the developer server 210 of the server system can upload a firmware update package to the device manager server 208. The firmware update package can be configured to be distributed to the group of wireless devices in the network of wireless devices including the wireless device 202. The firmware update package can be generated by the developer server 210. The device manager server 208 receives the firmware update package and processes the update package in accordance with a set of definitions and protocols so that the firmware update package is distributed to the group of wireless devices. At act 213, the device manager server 208 uploads the processed firmware update package to the software download server 206. Upon receiving the firmware update package, at act 214, the software download server 206 sends a triggering signal to the LwM2M server 204 indicating that the firmware update package is available to be downloaded by the group of wireless devices.

At act 216, the LwM2M server 204 can send instructions to the wireless device 202 for downloading the firmware update package from the software download server 206. In response to the instructions, at act 218, the wireless device 202 initiates the download of the firmware update package from the software download server 206. At act 221, the LwM2M server 204 sends a read (or observe) request to the wireless device 202 in order to determine whether the wireless device 202 has successfully downloaded the firmware update package from the software download server 206.

A read request can refer to a function where data previously written to a file is read. For example, when any portion of the writing of a file has not been successfully completed, the read request returns a value of zero. When the writing has been successfully completed, the read request returns a value corresponding to the number of bytes read. In order to determine that the writing of a file has been successfully completed, sending the read request can be repeated until a non-zero value has been returned. In contrast, an observe request can refer to a function of returning a value upon successfully completing the writing (e.g., no multiple requests are required).

The read request can include instructions for the wireless device 202 to send an indication that the download of the firmware update package has been successfully completed. For example, the LwM2M server 204 sends the wireless device 202 multiple repeated read requests at a certain frequency (e.g., every five minutes, every ten minutes, or every 30 minutes) until the wireless device 202 returns a value, upon completing the downloading, indicating that the wireless device 202 has successfully completed downloading the firmware update package. The observe request can include instructions for the wireless device 202 to return a value indicating that the wireless device 202 has successfully completed downloading the firmware update package upon completing the download. After the wireless device 202 has successfully completed the download from the software download server 206, at act 222, the wireless device 202 can return a state value indicating that the firmware update package has been successfully downloaded in response to the read or observe request. In response to receiving the indication that the firmware update package has been successfully downloaded by the wireless device 202, the LwM2M server 204 sends a request to the wireless device 202 at act 224 to initiate execution of the downloaded firmware update package and the wireless device 202 initiates the execution accordingly.

At act 228, the LwM2M 204 sends the wireless device 202 a read (or observe) request to inquire the current version of firmware on the wireless device 202. For example, LwM2M 204 can inquire the current version of the firmware to determine whether the wireless device 202 has successfully completed executing the firmware update package. When the wireless device 202 has successfully completed the execution of the firmware update package (e.g., at act 226), the wireless device 202 can return a value corresponding to the most recent version of the firmware available for the wireless device 202. At act 230, the LwM2M 204 can further send a read (or observe) request to the wireless device 202 to inquire state of the latest successful firmware update on the wireless device 202. For example, when the wireless device 202 has successfully completed executing the firmware update package (e.g., at act 226), the wireless device 202 can return a value indicating that the update is completed. In accordance with the successful completion of executing the firmware update package (e.g., the firmware update has been successfully updated at act 226), the wireless device 202 returns the value corresponding to the current version of the firmware and an indication that the firmware update has been completed successfully to the LwM2M server 204 at act 232.

At act 234, the LwM2M server 204 further sends an indication that the firmware update has been successfully completed by the wireless device 202 to the device manager server 208 which can forward the indication further to the developer server 210. At act 236, the developer server 210 can save the indication to a database or datastore of the developer server 210. The database or datastore can thereby store information regarding the current version of the firmware and/or the state of the latest firmware update of the group wireless devices in the network of wireless devices. The information stored in the database or datastore of the developer server 210 can be used to track the status of firmware updates across the group of wireless devices in the network of wireless devices as well as to generate customized update packages for respective wireless devices in the group of wireless devices in the network of wireless devices.

Alternatively, in some implementations, the execution of the firmware update package is interrupted by a de-registration/re-registration of the wireless device 202 from the network of wireless devices at act 237 in FIG. 2B. For example, the de-registering occurs while the wireless device has been downloading a firmware package (e.g., act 218 in FIG. 2A) or while executing the firmware package (e.g., act 224 in FIG. 2A). The de-registration can halt (e.g., stop or pause) the execution of the firmware update package because, for example, the wireless device 202 requires access to the network of wireless devices during the execution. The de-registration can happen at any time after the wireless device 202 has initiated the execution of the firmware update package. For example, the de-registration can happen once the wireless device 202 has successfully executed a first portion of the firmware update package (e.g., less than 100%) while a second portion remains unexecuted when the de-registration happens. The de-registering can correspond to an instance where the wireless device 202 has lost a connection to the network of wireless devices because the wireless device 202 has been switched off, the wireless device 202 has been moved to a location outside the coverage of the network of wireless devices, or the network of wireless devices is interrupted (e.g., by a network outage). The de-registering can be intentional or unintentional. For example, a user can intentionally turn off the wireless device 202 or move the wireless device 202 to a location that is outside the coverage area of the network of wireless devices. An example of unintentional de-registering can be an interruption in the network of wireless devices operation.

After a period of being de-registered from the network of wireless devices, the wireless device 202 can re-register to the network of wireless devices. For example, the wireless device 202 is able to re-establish communication with the network of wireless devices. Re-establishing the communication can be performed, for example, after the wireless device 202 is turned back on, the wireless device 202 is moved back to a location that is within the coverage area of the network of wireless devices, or the operation of the network of wireless devices has been restored after an interruption.

In some implementations, instead of being interrupted by the de-registration, the execution of the firmware update package can in fact be completed successfully at the wireless device 202, but the server system 203 could have failed to receive a confirmation of the successful completion of the firmware update. In response to any of the instances described above, the server system continues the actions to confirm that the firmware of the wireless device 202 is updated successfully.

At act 238, in instances where the wireless device 202 has not successfully completed the execution of the firmware update package, the wireless device 202 can return (e.g., in response to reading the current version of the firmware at act 228) to the LwM2M server 204 a value that does not correspond to the most recent version of the firmware available for the wireless device 202. For example, the value corresponds instead to an older version of the firmware.

At act 240, in response to a failure to complete the firmware update, the wireless device 202 can return, in response to the reading request to inquire the latest successful update state at act 230, a value corresponding to the most recent version of the firmware available for the wireless device 202. For example, when the wireless device 202 has executed only a portion of the firmware update package, the wireless device 202 can return a value indicating that the portion of the firmware update package has been executed (e.g., any value lower than 100%, such as 10%, 20%, 50%, 80% or 90%).

In response to receiving the returned values at acts 238 and 240, at act 242 the LwM2M 204 sends a request for an upgraded update package to the device manager server 208. The device manager server 208 further sends the request to the developer server 210. The request for the upgraded update package includes the latest successful update state at the wireless device 202. For example, the request can indicate the portion of the firmware update package that has been executed. At 243, in response to receiving the request that includes the latest successful update state at the wireless device 202, the developer server 210 saves the information regarding the latest successful update state at the wireless device 202 to the database or datastore of developer server 210.

In response to the request, at act 244, the developer server 210 generates an upgraded package to the firmware update package. The upgraded update package can correspond to the portion of the firmware update package that has not yet been executed by the wireless device 202. The upgraded package, therefore, has a smaller size than the firmware update package generated and uploaded by the developer server 210 at the beginning of the workflow 200. The upgraded update package will also require less time for the wireless device 202 to download and execute compared to the firmware update package generated at the beginning of the workflow 200.

At act 245, the developer server 210 can upload the upgraded update package to the device manager server 208 which, after processing, can further send the upgraded update package to the software download server 206. Upon receiving the upgraded update package, at act 246 the software download server 206 sends a triggering signal to the LwM2M server 204 indicating that the upgraded update package is available to be downloaded by the wireless device 202. At act 248, the LwM2M server 204 can send instructions to the wireless device 202 for downloading the upgraded update package from the software download server 206. In response to the instructions, at act 250, the wireless device 202 can download the upgraded update package from the software download server 206. In response to receiving an indication that the upgraded update package has been successfully downloaded by the wireless device 202 (e.g., repeating acts 221 and 222), at act 252, the Lwm2M server 204 can send instructions to the wireless device 202 to initiate execution of the downloaded upgraded update package and the wireless device 202 can initiate the execution accordingly. The wireless device 202 then can continue to execute the firmware update from where it was left before the interruption caused by the de-registering/re-registering by executing the upgraded update package.

In accordance with the successful completion of executing the upgraded update package, at 254 the wireless device 202 can return the value corresponding to the current version of the firmware and an indication that the upgraded update has been completed successfully to the LwM2M server 204 (e.g., in response to receiving read or observe requests described with respect to acts 228 and 230). At act 256, the LwM2M server 204 can further send the indication that the firmware update has been successfully completed by the wireless device 202 to the device manager server 208 which can forward the indication further to the developer server 210. At act 258, the developer server 210 can save the indication to a database or datastore of the developer server 210.

Processes

Figure 3:
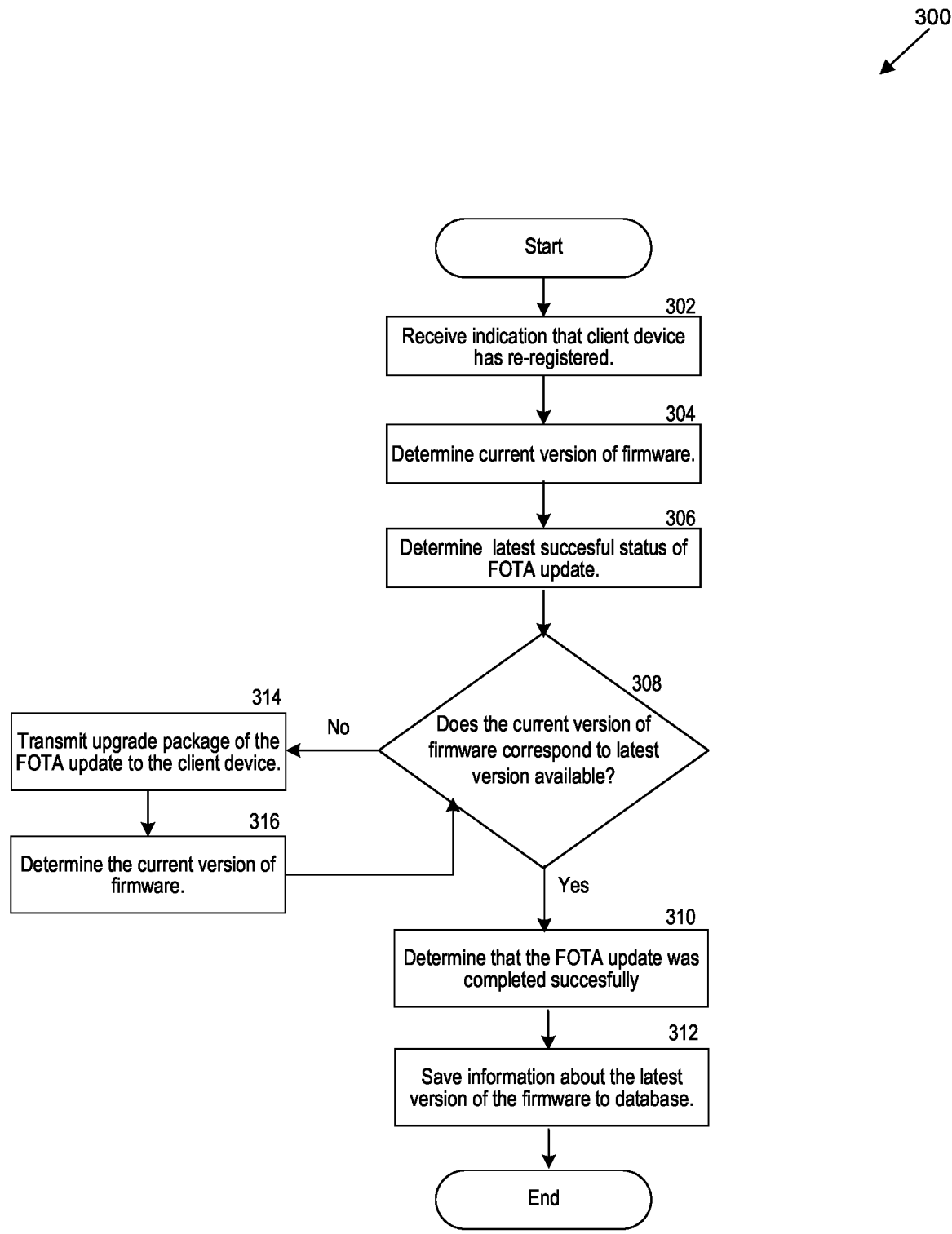
FIG. 3 is a flowchart illustrating processes performed by a server system for updating firmware of a wireless device in an IoT network in some implementations.

FIG. 3 is a flowchart illustrating a process 300 performed by a server system (e.g., the server system 203 in FIGS. 2A and 2B) for updating the firmware of a wireless device (e.g., the wireless device 202) in a network of wireless devices. The process 300 can be performed by a server system including one or more computing systems (e.g., the server system 203 includes servers 204, 206, 208, and 210).

In some implementations, the server system includes one or more computer systems 500 described below with respect FIG. 5. The server system includes at least one hardware processor and at least one non-transitory memory storing instructions. The instructions cause the server system to perform the process 300 when executed by the at least one hardware processor.

At act 302, the server system (e.g., the server system 203 in FIGS. 2A and 2B) receives an indication that the wireless device has re-registered to the network of wireless devices after a period of time after de-registering, as discussed above. As described with respect to FIG. 2A, in some implementations, the de-registering corresponds to an instance where the wireless device has lost a connection to the network of wireless devices. For example, the wireless device has been switched off, the wireless device has been moved to a location outside the coverage of the network of wireless devices, or the network of wireless devices is interrupted (e.g., by a network outage). The de-registering can be intentional or unintentional. For example, the user of the wireless device can intentionally turn off the wireless device for a period of time. As another example, the network of wireless devices is interrupted due to extrinsic circumstances (e.g., a network outage). The re-registering can be triggered when the wireless device is re-connected to the network of wireless devices after the period of time.

For example, the de-registering corresponds to losing a communication with a nearby wireless device in the IoT and re-registration corresponds to gaining the communication with the nearby wireless device back again. In some implementations, the de-registration corresponds to losing a communication with a network access node (e.g., an IoT master node) and re-registration corresponds to gaining the communication with the network access node back again. Upon the re-registration, the wireless device can automatically send the indication to the server system (e.g., the wireless device 202 automatically sends an indication to the LwM2M server 204 in FIGS. 2A and 2B).

At act 304, subsequent to re-registering, the server system determines a current version of firmware of the wireless device (e.g., acts 228 through 232 in FIG. 2A). In some implementations, determining the current version of firmware of the wireless device is performed in response to determining that the FOTA update on the wireless device is incomplete or unknown. The FOTA update being incomplete can indicate that the server system has not received a confirmation that the FOTA update on the wireless device was completed.

In some implementations, the de-registering occurs while the wireless device has been downloading a firmware package (e.g., act 218 in FIG. 2A) or while executing the firmware package (e.g., act 224 in FIG. 2A). The de-registering can have interrupted completing the firmware update on the wireless device. Alternatively or additionally, even though the firmware update on the wireless device can be completed, the server system may not have received a confirmation (e.g., acts 232 and 234 in FIG. 2A) from the wireless device that the firmware update was completed because of the de-registration.

For example, the server system may not have received the confirmation that the firmware was completed on the wireless device for a period of time (e.g., 12 hours, 24 hours, 48 hours, or a week) and therefore the server system (e.g., LwM2M server 204 and/or developer server 210 of server system 203 in FIG. 2A) determines that the firmware update status is incomplete or unknown. In some implementations, the period of time is pre-defined. The period of time can be pre-defined by the server system, by a telecommunications provider, or a telecommunications administrator. For example, the server system pre-defines the period of time to be 24 hours. In some implementations, the period of time is configurable based on factors associated with the wireless device, the network of wireless devices, or other relevant factors. For example, the period of time is configured based on a location of the wireless device or a type of wireless device. As another example, the period of time is configured based on a number of wireless devices included in the IoT or a status of the IoT (e.g., the IoT is experiencing a partial or full outage).

In some implementations, act 304 can be triggered by events other than re-registration. The determination of the current version of firmware of the wireless device can be initiated after a default time regardless of whether the wireless device 202 has initiated a re-registration or not. For example, the server system determines the current version of the firmware after 12 hours, 24 hours, 48 hours, or a week that the wireless device has failed to confirm that the FOTA update has been successfully completed.

At act 306, the server system determines a latest successful status of a FOTA update on the wireless device. As described above with respect to FIGS. 2A and 2B, determining the latest successful status of the FOTA update on the wireless device includes sending, by the system to the wireless device, an observe request related to a status of the FOTA update (e.g., at act 230 in FIG. 2A). The observe request can include instructions for the wireless device to send an indication (e.g., at act 232 in FIG. 2A) that the wireless device has completed the FOTA update upon completing the FOTA update.

In some implementations, determining the latest successful status of the FOTA update on the wireless device further includes sending, by the server system to the wireless device, a read request related to the status of the FOTA update. The read request can include instructions for the wireless device to send the latest successful status of the FOTA update on the wireless device to the server system. For example, the server system sends multiple repeated read requests at a certain frequency until the wireless device sends an indication that the wireless device has completed the FOTA update.

At act 308, the server system determines whether the current version of the firmware corresponds to a latest version of the firmware available. For example, the server system determines whether the current version of the firmware returned by the wireless device 202 at act 232 in FIG. 2A corresponds to the latest version of the firmware made available by the developer server 210. At act 310, in accordance with a determination that the current version of the firmware of the wireless device does correspond to the latest version of the firmware available, the server system determines that the FOTA update on the wireless device was completed successfully.

In some implementations, determining that the FOTA update on the wireless device was completed further includes receiving an indication from the wireless device that the FOTA update was completed (e.g., at act 232 in FIG. 2A the wireless device 202 sends an indication that the FOTA update was completed). The wireless device can send the indication that the FOTA update was completed in response to the observe request described at act 306.

At act 312, the server system saves information (e.g., regarding the latest version of the firmware of the wireless device to a database or a datastore associated with the server system. In some implementations, the server system also saves information regarding the completed FOTA update to the database or datastore associated with the server system. For example, as described with respect to FIG. 2A, the LwM2M server 204 sends an indication to the developer server 210 of the server system 203 that the FOTA update on the wireless device 202 is completed at act 234. In response to receiving the indication, the developer server 210 saves the information regarding the latest version of the firmware and completed FOTA update to its database or datastore.

At act 314, in accordance with a determination that the current version of the firmware of the wireless device does not correspond to the latest version of the firmware available, the server system transmits an upgrade package of the FOTA update to the wireless device (e.g., at acts 244, 246 in FIG. 2B). The server system also transmits an indication of the latest successful status of the FOTA update. The server system thereby enables the wireless device to continue the FOTA update from the latest successful status of the FOTA update. In some implementations, the upgrade package of the FOTA update corresponds to a portion of a FOTA update package that has not been executed by the wireless device in accordance with the latest successful status of the FOTA update. The server system can generate the upgrade package of the FOTA update in accordance with the latest successful status of the FOTA update on the wireless device.

In some implementations, the server system includes a FOTA developer server (e.g., the developer server 210 in FIGS. 2A and 2B). The FOTA developer server can be configured to generate and provide a FOTA update package to the wireless device. For example, as described with respect to FIGS. 2A and 2B, the upgrade package of the FOTA update is generated by the developer server 210 of server system 203. The developer server 210 can generate the upgrade package of the FOTA update based on a request or an indication received from the LwM2M server 204 in accordance with the determination that the current version of the firmware of the wireless device does not correspond to the latest version of the firmware available. In some implementations, the database or the datastore associated with the server system is associated with the FOTA developer server 210. For example, the database or the datastore of developer server 210 can be configured to store the information regarding the latest version of the firmware of the wireless device.

At act 316, subsequent to transmitting the upgrade package of the FOTA update and the indication of the latest successful status of the FOTA update, the server system determines the current version of the firmware of the wireless device. The server system then returns to act 308 and determines whether the current version of the firmware corresponds to a latest version of the firmware available. In accordance with the determination that the current version of the firmware of the wireless device corresponds to the latest version of the firmware available, the server system determines that the FOTA update on the wireless device was completed successfully at act 310, as described above. The server system then saves the information regarding the latest version of the firmware of the wireless device to the database or datastore associated with the server system (e.g., at act 236 in FIG. 2A).

In some implementations, the FOTA update performed by processes 300 is a batch update that is configured to be downloaded and executed by a group of wireless devices in the network of wireless devices simultaneously. The wireless device can be included in the group of wireless devices. For example, the group of wireless devices includes more than one thousand wireless devices to be updated by the FOTA update simultaneously.

The tracking of the current firmware version and the latest successful status of the FOTA update of the wireless device described with respect to processes 300 enables the wireless device to continue the FOTA update from the latest successful status by downloading the upgraded package of the FOTA update. Without such tracking, the wireless device would be required to repeat downloading the full FOTA update package and executing the full FOTA package. The tracking of the current firmware version and the latest successful status of the FOTA update of the wireless device thereby reduces the time and processing power required for FOTA updates interrupted by de-registration occurrences. Furthermore, the processes 300 enable saving the information regarding the latest version of the firmware as well as the latest successful status of the FOTA update to its database or datastore. This information is easily retrievable and enables efficient and convenient tracking of the firmware updates for future firmware updates.

Figure 4:
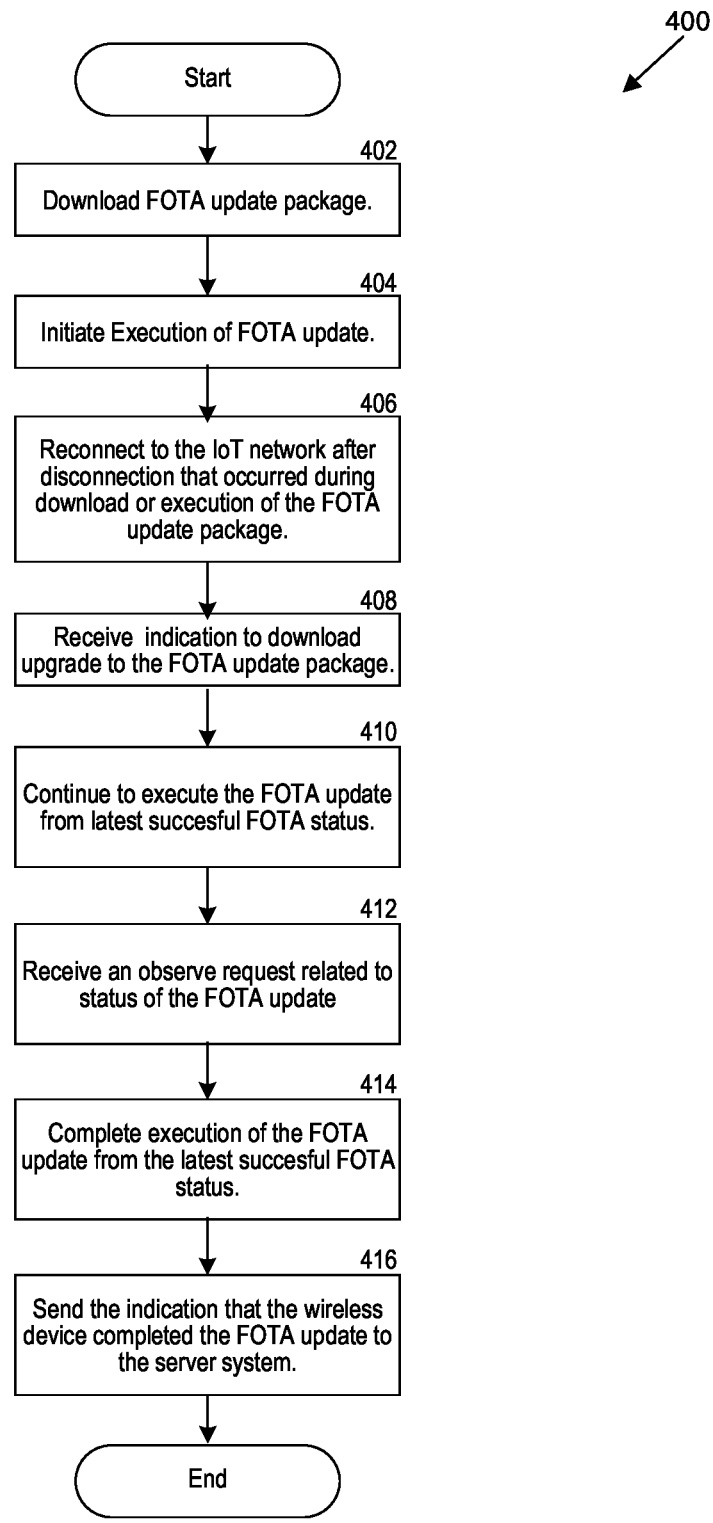
FIG. 4 is a flowchart that illustrates processes performed by a wireless device in an (IoT) network for updating firmware of the wireless device in some implementations.

FIG. 4 is a flowchart that illustrates a process 400 performed by a wireless device (e.g., wireless device 202 in FIGS. 2A and 2B) in an (IoT) network for updating the firmware of the wireless device. In some implementations, the wireless device corresponds to the computer system 500 described below with respect to FIG. 5. The wireless device includes at least one hardware processor and at least one non-transitory memory storing instructions. The instructions cause the wireless device to perform the process 400 when executed by the at least one hardware processor.

At act 402, the wireless device downloads a FOTA update package from a server system. For example, as shown in FIGS. 2A and 2B, the wireless device 202 downloads the FOTA update package from the server system 203 at act 218. At act 404, the wireless device initiates executing a FOTA update by executing the downloaded FOTA update package (e.g., at act 224).

At act 406, the wireless device reconnects to the network or wireless devices (e.g., the IoT network) after a disconnection that occurred during the device downloading or executing the FOTA update package (e.g., de-registering and re-registering at act 237). The wireless device has disconnected from the network of wireless devices in response to a first triggering event that occurred during the download or execution of the downloaded FOTA update package. The wireless device reconnects to the network of wireless devices in response to a second triggering event. For example, the first triggering event can correspond to an instance where the user of the wireless device turns the wireless device off or moves the wireless device to a location that is outside the coverage area of the network of wireless devices. The second triggering event corresponds to an instance where the user switches the wireless device on again or moves the wireless device to a location within the coverage area of the network of wireless devices, respectively.

At act 408, the wireless device receives, from the server system, an indication to download an upgrade to the FOTA update package (e.g., at act 248 in FIG. 2B). The upgrade to the FOTA update package corresponds to a portion of a FOTA update package that has not been executed by the wireless device in accordance with the latest successful status of the FOTA update. For example, the server system 203 has determined the latest successful status of the FOTA update. When the latest successful FOTA status indicates that executing the FOTA update was not completed successfully, the server system 203 generates an upgrade package to the FOTA update package that corresponds to the portion of the FOTA update package that has not been executed by the wireless device. At act 410, the wireless device then continues to execute the FOTA update from the latest successful FOTA status. As explained above, continuing to execute the FOTA update from the latest successful FOTA status, instead of downloading and executing the full FOTA update package, reduces the time and power consumption of the wireless device to complete the FOTA update.

At act 412, the wireless device receives an observe request related to a status of the FOTA update from the server system (e.g., at act 232). The observe request includes instructions to send an indication that the wireless device has completed the FOTA update to the server system upon completion of executing the FOTA update.

At act 414, the wireless device successfully completes the execution of the FOTA update from the latest successful FOTA status. At act 416, subsequent to completing the execution of the FOTA update, the wireless device sends the indication that the wireless device has completed the FOTA update to the server system.

Computer System

Figure 5:
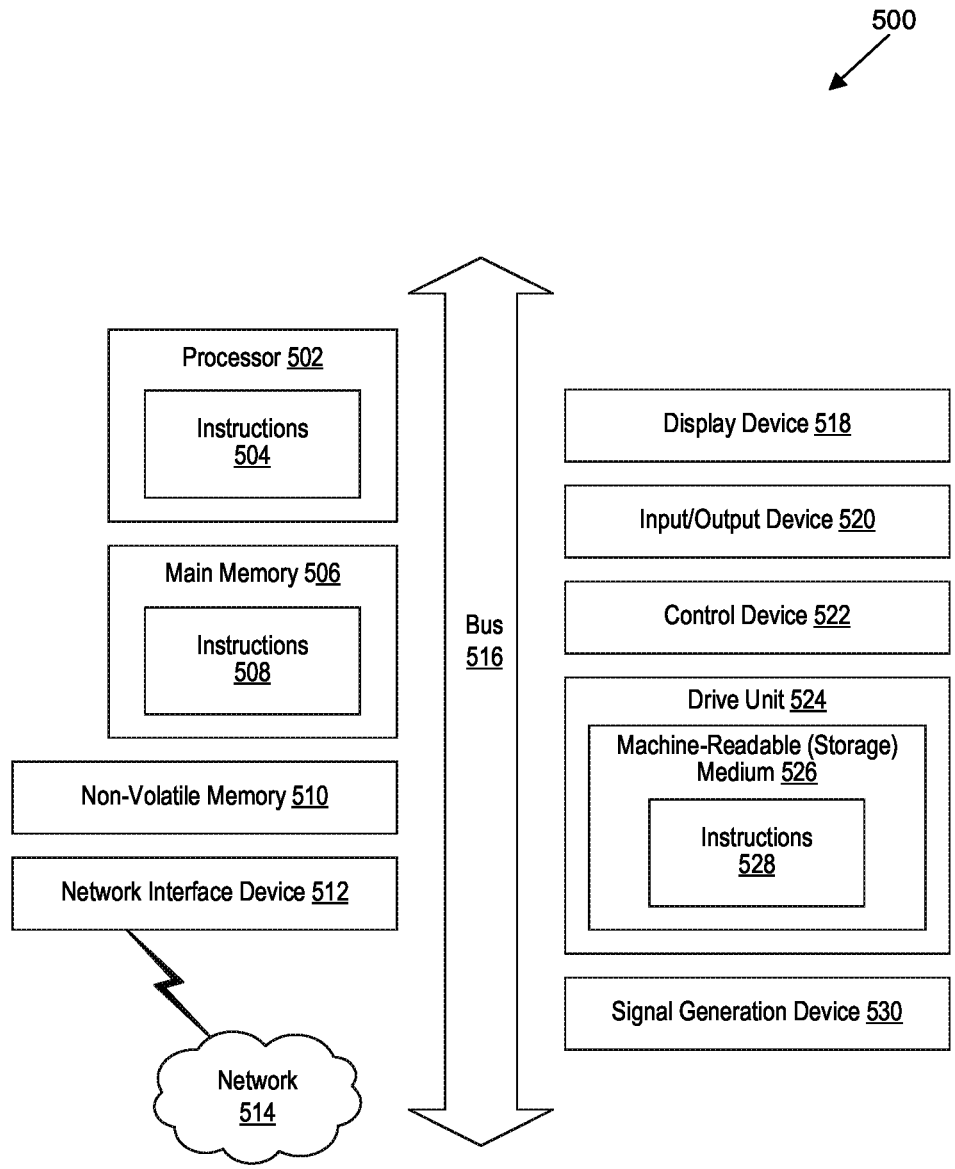
FIG. 5 is a block diagram that illustrates components of a computing device in some implementations.

FIG. 5 is a block diagram that illustrates an example of a computer system 500 in which at least some operations described herein can be implemented. The computer system 500 can correspond to wireless device 202 and/or servers 204 through 210 of the server system 203 described above with respect to FIG. 2.

As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database or datastore and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A server system for updating firmware of a client device in a narrowband internet of things (IoT) network, the server system comprising:
   at least one hardware processor; and
   at least one non-transitory memory storing instructions, which, when executed by the at least one hardware processor, cause the server system to:
      receive an indication that the client device has re-registered after a period of time after de-registering;
      determine a current version of firmware of the client device;
      determine a latest successful status of a firmware over-the-air (FOTA) update on the client device;
      in accordance with a determination that the current version of the firmware of the client device corresponds to a latest version of the firmware available,
         determine that the FOTA update on the client device was completed successfully; and
         save information regarding the latest version of the firmware of the client device to a database associated with the server system;
      in accordance with a determination that the current version of the firmware of the client device does not correspond to the latest version of the firmware available,
         transmit an upgrade package of the FOTA update to the client device and an indication of the latest successful status of the FOTA update thereby enabling the client device to continue the FOTA update from the latest successful status of the FOTA update;
         subsequent to transmitting the upgrade package of the FOTA update and the indication of the latest successful status of the FOTA update, determine the current version of the firmware of the client device;
         in accordance with the determination that the current version of the firmware of the client device corresponds to the latest version of the firmware available,
            determine that the FOTA update on the client device was completed successfully; and
            save the information regarding the latest version of the firmware of the client device to the database associated with the server system.

2. The server system of claim 1, wherein the instructions further cause the server system to:
   save, in accordance with the determination that the FOTA update on the client device is complete, information regarding the completed FOTA update to the database associated with the server system.

3. The server system of claim 1, wherein determining the latest successful status of the FOTA update on the client device includes:
   sending, to the client device, an observe request related to a status of the FOTA update, the observe request including instructions to send, by the client device upon completing the FOTA update, an indication that the client device has completed the FOTA update.

4. The server system of claim 1, wherein determining the latest successful status of the FOTA update on the client device further includes:
   sending, to the client device, a read request related to the status of the FOTA update, the read request including instructions to send, by the client device, the latest successful status of the FOTA update on the client device.

5. The server system of claim 1, wherein:
   determining, subsequent to receiving the indication that the client device has re-registered, the current version of firmware of the client device is performed in response to determining that the FOTA update on the client device is incomplete,
   the FOTA update being incomplete indicates that the server system has not received a confirmation that the FOTA update on the client device was completed, and
   the client device was de-registered while the FOTA update was executed on the client device.

6. The server system of claim 1, wherein the de-registering corresponds to an instance where the client device has lost a connection to the IoT network.

7. The server system of claim 1, wherein:
   the server system includes a FOTA developer server, and
   the FOTA developer server is configured to generate and provide a FOTA update package to the client device.

8. The server system of claim 7, wherein:
   the database associated with the server system is saved at the FOTA developer server, the database configured to store the information regarding the latest version of the firmware of the client device.

9. The server system of claim 1, wherein:
   the FOTA update is a batch update that is configured to be downloaded and executed by a group of client devices in the narrowband IoT network simultaneously, and
   the client device is included in the group of client devices.

10. The server system of claim 1, wherein:
    the upgrade package of the FOTA update corresponds to a portion of a FOTA update package that has not been executed by the client device in accordance with the latest successful status of the FOTA update.

11. The server system of claim 1, wherein:
    the instructions cause the server system to generate the upgrade package of the FOTA update in accordance with the latest successful status of the FOTA update on the client device.

12. A non-transitory computer-readable medium comprising instructions configured to cause one or more processors of a server system to perform a method for updating firmware of a client device in an internet of things (IoT) network, the method comprising:
    receiving an indication that the client device has re-registered after a period of time after de-registering and that a firmware over-the-air (FOTA) update on the client device has failed;
    determining a current version of the firmware of the client device;
    determining a latest successful status of the FOTA update on the client device;
    in accordance with a determination that the current version of the firmware of the client device does not correspond to a latest version of firmware available,
       transmitting an upgrade package of the FOTA update to the client device and an indication of the latest successful status of the FOTA update thereby enabling the client device to continue the FOTA update from the latest successful status of the FOTA update;
    receiving, from the client device, an indication that the FOTA update on the client device was completed;
    in response to receiving the indication that the FOTA update on the client device was completed, saving information regarding the current version of the firmware of the client device to a datastore associated with the server system.

13. The non-transitory computer-readable medium of claim 12, wherein the method further comprises:
save, in accordance with the determination that the FOTA update on the client device is complete, information regarding the completed FOTA update to a database associated with the server system.

14. The non-transitory computer-readable medium of claim 12, wherein determining the latest successful status of the FOTA update on the client device includes:
sending, to the client device, an observe request related to a status of the FOTA update, the observe request including instructions to send, by the client device upon completing the FOTA update, an indication that the client device has completed the FOTA update.

15. The non-transitory computer-readable medium of claim 12, wherein determining the latest successful status of the FOTA update on the client device further includes:
sending, to the client device, a read request related to the status of the FOTA update, the read request including instructions to send, by the client device, the latest successful status of the FOTA update on the client device.

16. A wireless device in communication with an internet of things (IoT) network, the wireless device comprising:
at least one hardware processor; and
at least one non-transitory memory storing instructions, which, when executed by the at least one hardware processor, cause the wireless device to:
download a firmware over-the-air (FOTA) update package from a server system;
initiate executing a FOTA update by executing the downloaded FOTA update package;
disconnect from the IoT network in response to a first triggering event occurring during download or execution of the downloaded FOTA update package;
reconnect to the IoT network in response to a second triggering event;
receive, from the server system, an indication to download an upgrade to the FOTA update package and to continue to execute the FOTA update from a latest successful FOTA status, the latest successful FOTA status indicating that executing the FOTA update was not completed successfully;
receive, from the server system, an observe request related to a status of the FOTA update, the observe request including instructions to, upon completion of executing the FOTA update, send an indication that the wireless device has completed the FOTA update to the server system;
continue to execute the FOTA update from the latest successful FOTA status; and
subsequent to completing the execution of the FOTA update, send the indication that the wireless device has completed the FOTA update to the server system.

17. The wireless device of claim 16, wherein:
the upgrade to the FOTA update package corresponds to a portion of a FOTA update package that has not been executed by the wireless device in accordance with the latest successful status of the FOTA update.

18. The wireless device of claim 16, wherein:
the first triggering event corresponds to the wireless device turning off or moving the wireless device to a location that is outside a coverage area of the IoT network.

19. The wireless device of claim 16, wherein:
the second triggering event corresponds to the wireless device turning on after being turned off or moving the wireless device to a location that is inside a coverage area of the IoT network after being located outside the coverage area.

20. The wireless device of claim 16, wherein:
the FOTA update is a batch update that is configured to be downloaded and executed by a group of wireless devices in the IoT network simultaneously, and
the wireless device is included in the group of wireless devices.

* * * * *